No. 795,007. PATENTED JULY 18, 1905.
G. W. RIGBY.
BRIQUETING MACHINE.
APPLICATION FILED AUG. 20, 1904.

No. 795,007. PATENTED JULY 18, 1905.
G. W. RIGBY.
BRIQUETING MACHINE.
APPLICATION FILED AUG. 20, 1904.

WITNESSES:

INVENTOR
Grant W. Rigby.
BY
ATTORNEY.

No. 795,007. PATENTED JULY 18, 1905.
G. W. RIGBY.
BRIQUETING MACHINE.
APPLICATION FILED AUG. 20, 1904.

WITNESSES:
Robert H. Arthelm.
Ow A Leonard.

INVENTOR.
Grant W. Rigby.
BY
J. N. Cooke
ATTORNEY.

No. 795,007.

Patented July 18, 1905.

UNITED STATES PATENT OFFICE.

GRANT W. RIGBY, OF PITTSBURG, PENNSYLVANIA.

BRIQUETING-MACHINE.

SPECIFICATION forming part of Letters Patent No. 795,007, dated July 18, 1905.

Application filed August 20, 1904. Serial No. 221,462.

*To all whom it may concern:*

Be it known that I, GRANT W. RIGBY, a resident of Pittsburg, in the county of Allegheny and State of Pennsylvania, have invented a new and useful Improvement in Briqueting-Machines; and I do hereby declare the following to be a full, clear, and exact description thereof.

My invention relates to molding-machines, and has special reference to what are known as "briqueting-machines" for giving solid form or making briquets from granular or pulverulent fuel preparatory to burning the same, or from finely divided or pulverized ores or minerals preparatory to smelting the same, or from other semiplastic materials and similar uses.

The object of my invention is to provide a cheap, simple, and effective molding-machine for these purposes which will contain few parts, will be positive in its action, will not be liable to get out of order easily, and one in which the parts can be easily and quickly taken out for repairing, change, or renewal, as well as one providing for the proper adjustment of the parts, great strength, and one with all the working parts contained within the frame of the machine.

To enable others skilled in the art to which my invention appertains to construct and use my improved molding-machine, I will describe the same more fully, referring to the accompanying drawings, in which—

Fig. 2$^A$ is a longitudinal section taken at one side of the machine and adjacent to the sliding frames. Fig. 3$^A$ is a section like Fig. 2$^A$ with the parts in another position.

Like symbols of reference herein indicate like parts in each of the figures of the drawings.

The machine A is the same general type as that shown in my application filed April 4, 1904, Serial No. 201,440, and consists generally of the main frame 1, formed of one casting and composed of the side frames 2, connected by the front and rear portions 3 3' and by the bottom plate 4, while a cover-plate 2' extends from the rear portion 3' over a portion of the machine A and is bolted to said rear portion and side frames 2 by the bolts 2". The rear end of the bottom 4 is connected to the rear end portion 3' by the depressed portion 5, and the machine is supported upon the bed or foundation B by the side portions 2 and end portion 3'. Extending through the side frames 2 and at the rear end of the machine A is a crank-shaft 6, which has its bearings 7 in said side frames 2 and has a gear-wheel 8, mounted thereon outside of the frame 1, for meshing with a pinion 8', mounted on a counter-shaft 8" and through which power is applied to the machine. A crank-pin 9 is formed on the crank-shaft 6, and connected to this pin 9 by straps 9' is the pitman 10 for connecting with a cross-head 11 by means of the pivot-pin 12, journaled in said cross-head. The cross-head 11 is adapted to slide upon a plate 12', removably secured to the bottom plate 4 by the bolts 12", and under guides 11', extending out from the side frames 2, while removably fitting within seats 13' in said cross-head 11 are the reciprocating or compressing plungers 13, each of which is held in place within its seat 13' by a set-screw 13". The front end portion 3 of the frame 1 is provided with the openings 14', which are slightly enlarged at their outer ends 14", and within these openings 14' are the stationary backing-plungers 14, which are set on line with the plungers 13 and are each held in place by means of a set-screw 15', extending down through the end portion 3 and engaging with each of said plungers 14. Shearing-plates 15 pass down through vertical slots 16 in said end portion 3 and are supported by the lugs 16' thereon engaging with the top face of said end portion 3, so that the front ends of said plungers 14 will be backed against said plates 16.

Mounted upon guides 17'', formed on the side frames 2, is the feed-box 17, which has openings 18 formed in the rear wall 18' of the lower portion 17' thereof, through which the plungers 13 are adapted to travel to and from the mold-recesses 19, formed in the front wall 18'' of said lower portion 17'. This front wall 18'' forms a mold-plate 20 and has openings 20' through the same for forming said mold-recesses 19, while within said recesses are the bushings 19', which are held in place by the flanges 19'' on said front wall 18'' and projecting into said openings 20' therein, while the openings 20'', formed by and within said flanges 19'' and connecting the mold-recesses 19, are adapted to receive the rear ends of said plungers 14. The feed-box 17 is provided with the upper portion 21, which fits over the lower portion 17' to form the chamber 22 therein leading to the chamber 23 in the said lower portion 17', and the rear wall 21' of said top portion 21 is made on an incline to form a chute 22'' and rests upon the rear wall 18' of said lower portion 17', while the front wall 21'' of said top portion is formed vertical and has a flange 22'' thereon for resting on the front wall 18'' of said lower portion 17'.

Moving within the chamber 22 of the feed-box 17 are the feeding-plungers 24, which are adapted to travel along the plates 25, fitting within seats 25' in the bottom 23' of the feed-box 17 and extending up along the bushings 19', front wall 18'', and vertical wall 21'' in order to assist in guiding said plungers 24 and at the same time holding said bushings 19' in place, and such plates being provided with holes 25' therein for the passage of the plungers 13 through the same to and from the mold-recesses 19. Removably secured within a seat 24' in the rear of the feeding-plungers 24 are the pressure-plates 26, which are bolted together to the front wall 26' of said plungers 24, and passing through the upper portions 24'' of said plungers above said seats 24' and front walls 26' is a pin 27, which extends through vertical slots 27' in the end walls 27'' of the upper portion 21 of said feed-box 17 and is adapted to fit within a curved slot 28', formed in the front end 28'' of the rocking levers 28. These levers 28 are connected at the rear ends 29' to a rock-shaft 29, passing through and within a raised portion 2''' on the cover-plate 2', and is journaled in bearings 29'' on said plate and on each side of said raised portion 2'''. A rocking bar 30 is connected at its front end 30' to the rock-shaft 29 and within the raised portion 2'' of said cover-plate 2', so as to extend back along the center of the machine A, while its rear end 30 has a roller 31 journaled on a shaft 31' therein, which roller 31 is adapted to engage with a cam 32 on the crank-shaft 6. Extending out on each side of the rocking levers 28 are the sleeves 33, which are loosely mounted on the studs 33', secured in said levers, and have the flat faces 33'' under the same, from which extend the bars 34', which pass loosely down through the cover-plate 2' and side frames 2, so that the springs 34 can be confined around said bars and interposed between said flat faces 33'' and said cover-plate 2' to raise said levers 28 when they are depressed, as hereinafter described.

Extending down along the flange 22'' on the upper portion 21 and along the front wall 18'' on the lower portion 17' of the feed-box 17 is the knock-off plate 35, which is adapted to move or travel along said flange 22 and front wall 18'' in a vertical plane over the openings 20'', formed in the flanges 19'', connecting the mold-recesses 19 through the medium of the rock-shaft 36, which is journaled in the brackets 36', extending out from each of the front walls 21'' of said upper portion 21, and is connected to said knock-off plate 35 by means of the arms 35' on said shaft 36. Projecting out from said knock-off plate 35 are the safety-brackets 37, which are provided with the inclined lower faces 37' therein, so as to be engaged by the heads 14' on the stationary plungers 14 when the feed-box 17 is moved forward over said plungers 14, and so insure the raising of said plate 35, while the downward movement of said plate is limited by the end face 38 of the recessed portion 38' in the rear face of said knock-off plate 35 coming in contact with the flange 22'' on the upper portion 21 of said feed-box 17. Extending back from the top of said knock-off plate 35 and at each end thereof are the lugs 39', within which are adapted to be secured the upper ends of the rods 39'', while the lower ends of said rods are secured within the flange 22'' on the upper portion 21 of the feed-box 17, so that the spiral spring 39 can be confined around said rods 39'' and interposed between said lugs 39' and said flange 22'' to raise said knock-off plate 35 after being depressed, as hereinafter described.

The mechanism for reciprocating the feed-box 17 and for raising and lowering the knock-off plate 35 consists of the sliding frames 40, which are located on each inner side of the side frames 2 and adjacent thereto, such frames having openings 40' therein for the passage of the crank-shaft 6 through the same and said openings being provided with the cam-faces 41' 41'', with which cams 41 on said shaft 6 are adapted to engage. The sliding frames 40 are provided with the arms 42 thereon, which extend forward along the side frames 2 and are securely connected to the feed-box 17, as at 42'. Mounted on and carried by one of the sliding frames 40 is a rod 43, which is connected at its forward end to an arm 43' on the rock-shaft 36 for operating the knock-off device, and this rod 43 is loosely connected at its opposite end to the frame 40 by means of a slot 44 in said rod engaging with and fitting around a bolt or stud 44' on said frame 40, while a cam 45 on the crank-shaft 6 is adapted to engage with the pointed end 45' on said rod 43 to operate the knock-off plate 35.

Figure 1:
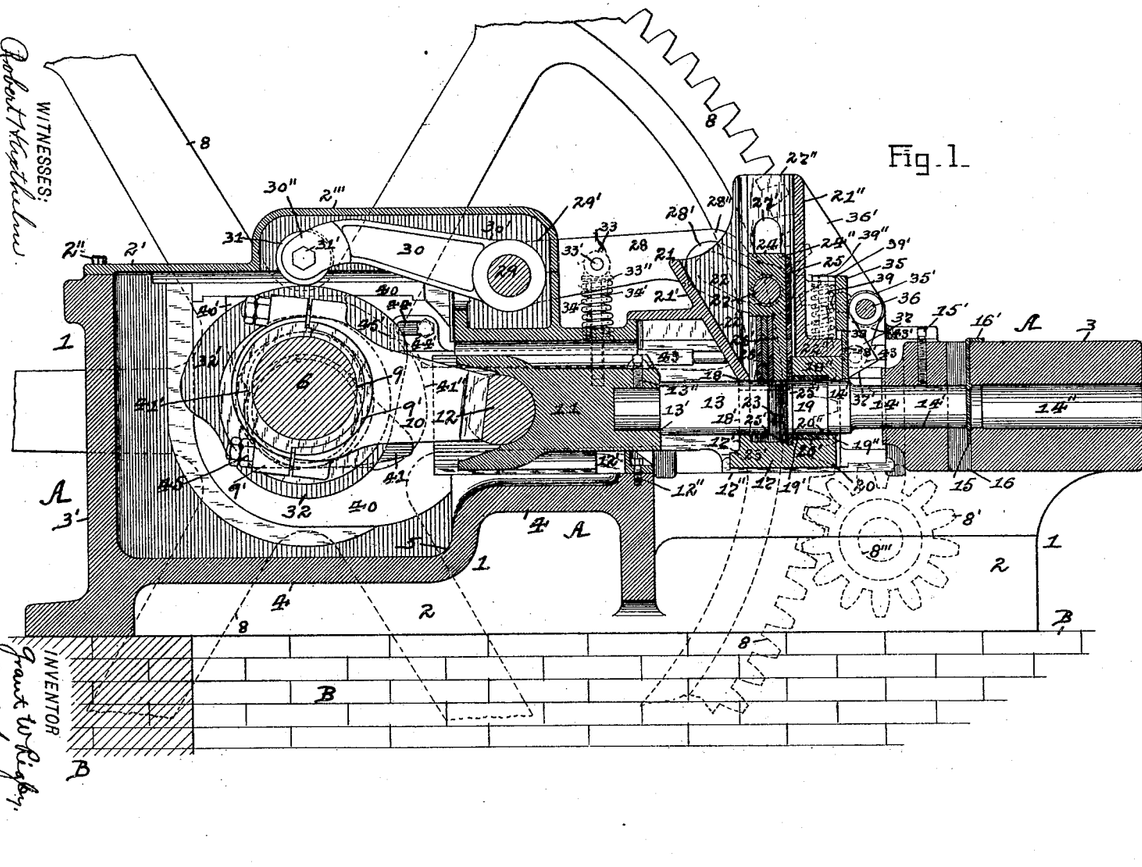
Figure 1 is a longitudinal central section of my improved molding-machine.
Figure 2:
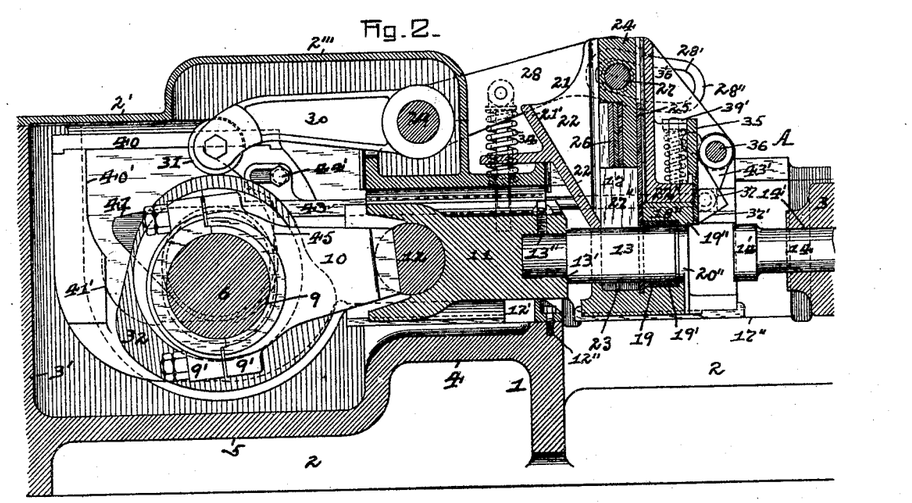
Fig. 2 is a like view showing a portion of the machine and showing the parts in another position.
Figure 2A:
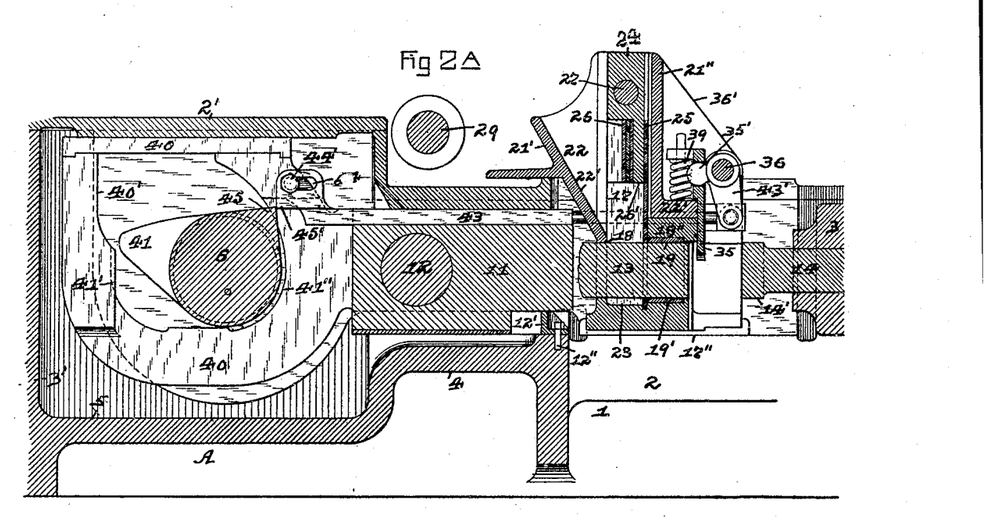
Figure 3:
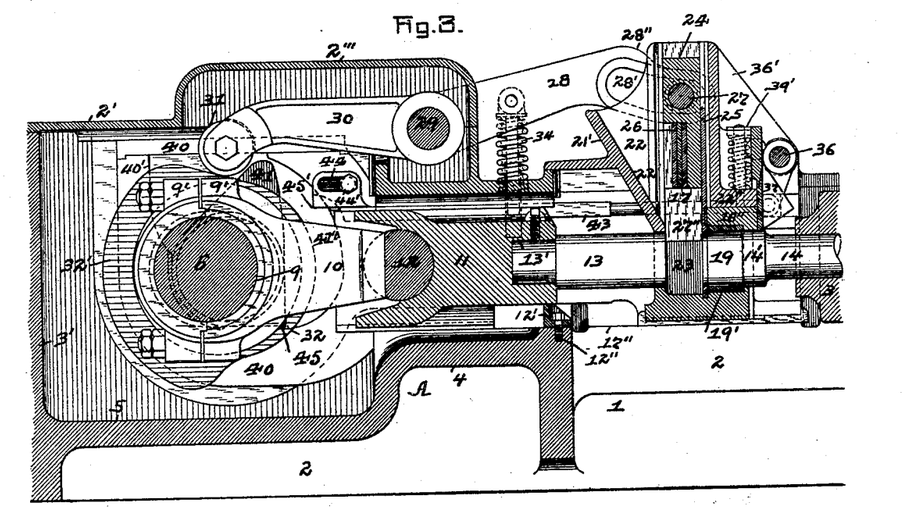
Fig. 3 is a similar view showing the parts in still another position.
Figure 3A:
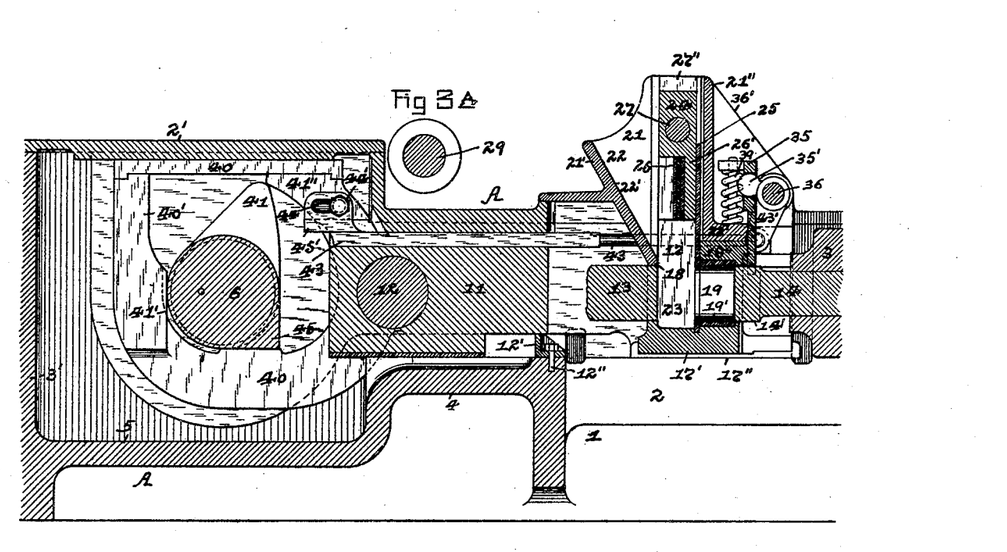
Figure 4:
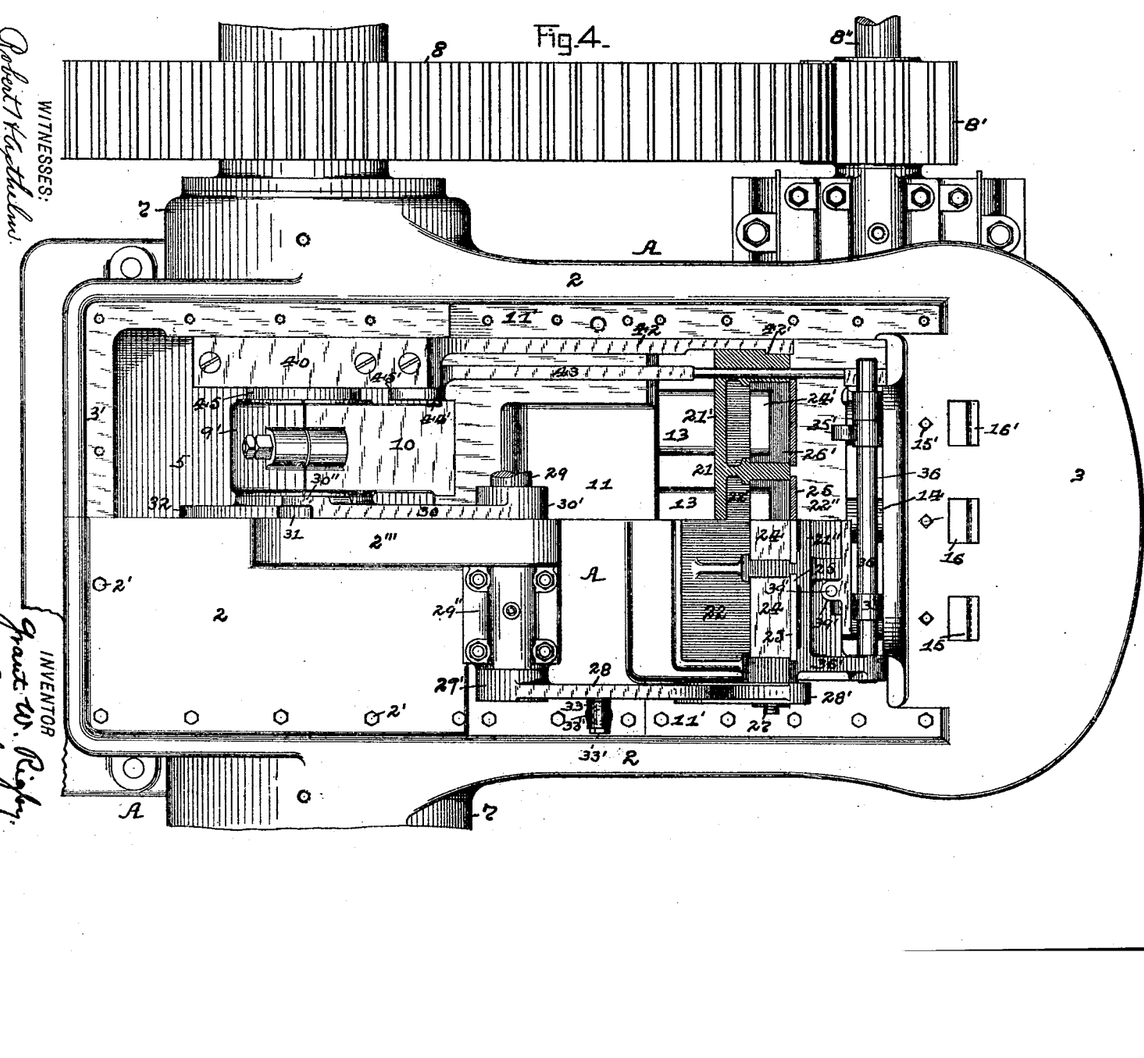
Fig. 4 is a top plan view of the machine, showing one-half of the cover removed and showing some of the parts in section.

The use and operation of my improved molding-machine are as follows: The material to be made into the form of blocks or briquets is fed into the chamber 22 of the feed-box 17 generally by means of a conveyer (not shown) or in any other suitable manner and power being applied to the shaft 8" will act to revolve the crank-shaft 6 through the medium of the pinion 8' on said shaft 8" meshing with the gear-wheel 8 on said shaft 6. As this crank-shaft 6 is thus revolved the feeding-plungers 24 within the chamber 22 of the feed-box 17 will be lowered down within said chamber, as shown in Fig. 1, through the medium of the cam 32 on the crank-shaft 6 engaging with the roller 31 on the rocking bar 30, thereby raising said bar and turning the rock-shaft 29 in order to lower the rocking levers 28, connected thereto, so that the material within said chamber 22 is fed down by the lower ends of the walls 26' on said plungers and pressure-plates 26 and into the chamber 23 of said feed-box. As the crank-shaft 6 is further revolved the cams 41 thereon are also revolved therewith and will engage the cam-face 41" on the cam-rods 42, which cam-rods being connected to the feed-box 17 the latter will be moved forward by said cams 41 and with them the feed-box 17, so that such feed-box reaches the position shown in Figs. 1 and 3, with the rear ends or heads 14' of the backing-plungers 14 within the openings 20', formed in the front wall 18" of said feed-box 17 and slightly entering the mold-recesses 19, formed in the mold-plate 20. As these cam-rods 42 and feed-box 17 are thus moved forward the cam-yokes 40, carried by said cam-rods 42, as well as the rod 43, carried by one of said rods 42, are also moved forward, and upon the further revolution of the crank-shaft 6 the pitmen 10, connected to the crank-pins 9 on said shaft 6, are moved forward and with them the cross-head 11 by reason of said pitmen being also connected with said cross-head through the pins 12. The cross-head 11 in moving forward slides on the plate 12' and under the guides 11', and by reason of the compressing-plungers 13 being carried by and connected to said cross-head the said plungers are made to travel from the openings 18 in the rear wall 18' of the feed-box 17, as shown in Fig. 3, through the chamber 23 of said feed-box and through the opening 25' in the plate 25, so as to enter the mold-recesses 19 and carry the material from within said chamber by the front ends of said plungers 13 to said recesses 19 in order to be compressed between the ends of the plungers 13 and 14 within said recesses 19. During this forward movement of the plungers 13 and feed-box 17 and upon the further revolving of the crank-shaft 6 the feeding-plungers 24 will be raised within the chamber 22 of said feed-box through the medium of the roller 31 leaving the engagement 32' on the cams 32, which will lower said roller and the bar 30, fitting around the same, while the shaft 29 will be turned in the opposite direction from that before described to raise the levers 28, connected thereto, and with them the said plungers 24, for another operation of feeding the material from the chamber 22 to the chamber 23 in said feed-box. After the material has been thus compressed within the mold-recesses 19 and upon the further revolution of the crank-shaft 6 the cams 41 on said shaft will engage with the cam-faces 41' on the crank-yokes 40 as said cams 41 are revolved with said shaft, so that the cam-rods 42 on said yokes and connected to and carrying the feed-box 17 are drawn back to the position shown in Fig. 2, as well as said yokes 40 and rod 43, carried on one of said rods 42 and yokes, so that upon the further revolution of the shaft 6 the cams 45 on said shaft will engage with the pointed end 45' on said rod 43 as said cam is revolved with said shaft and in passing said end the said cam will push the rod 43 forward by reason of the slot 44 in said rod engaging with the stud 44' on one of said yokes 40. As this rod 43 is thus pushed forward the knock-off plate 35 will be pushed down along the flange 22" and front wall 18" of the feed-box 17 by reason of said rod being connected to the arm 43' on the rock-shaft 36 and the arms 35' on said shaft being connected to said knock-off plate, so that the lower end of said plate 35 will engage with the blocks or briquets exposed by the drawing back of said feed-box and held on the front ends of said plungers 13 and knock said blocks or briquets off in case they should happen to stick to such end of said plungers, so that they can drop down through the machine A to be caught and carried away by any suitable means to the drier or furnace. During this downward movement of the knock-off plate 35 the springs 39 will be compressed between the lugs 39' in said plate and the flange 22", so that as soon as the plate 35 has engaged with and knocked off the blocks or briquets on the ends of the plungers 13 and cam 45 has passed the end 45' on the rod 43 the said plate will be immediately raised by the compression on said springs being relieved and the shaft 36 will be turned in the opposite direction from that before described, which will cause the rod 43 to be moved back in its normal position by reason of the seat 44 moving along the stud 44' and the said rod being connected to said shaft by the arm 43'. Upon the further revolving of the crank-shaft 6 the cross-head 11 will be drawn back in its guides 11' and along the plate 12' through the medium of the pitmen 10, connected to said shaft by the pins 9, thereby withdrawing the plungers 13 with said cross-head back through the mold-recesses 19 in the feed-box 17 from the position shown in Fig. 2 to the position shown in Fig. 3, when the machine is ready to move forward again and repeat the operations in forming the blocks or briquets.

Figure 5:
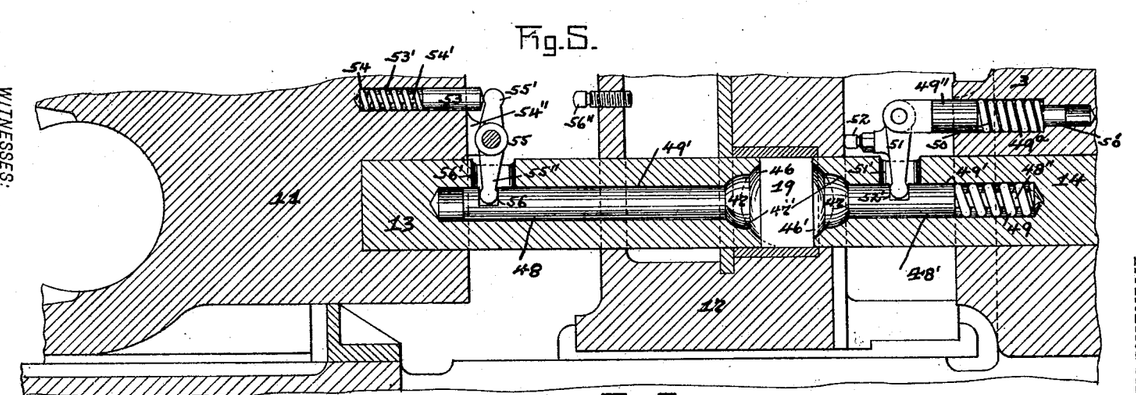
Fig. 5 is a detail sectional view showing the formation of another form of a briquet and means for removing the same from the mold.
Figure 6:
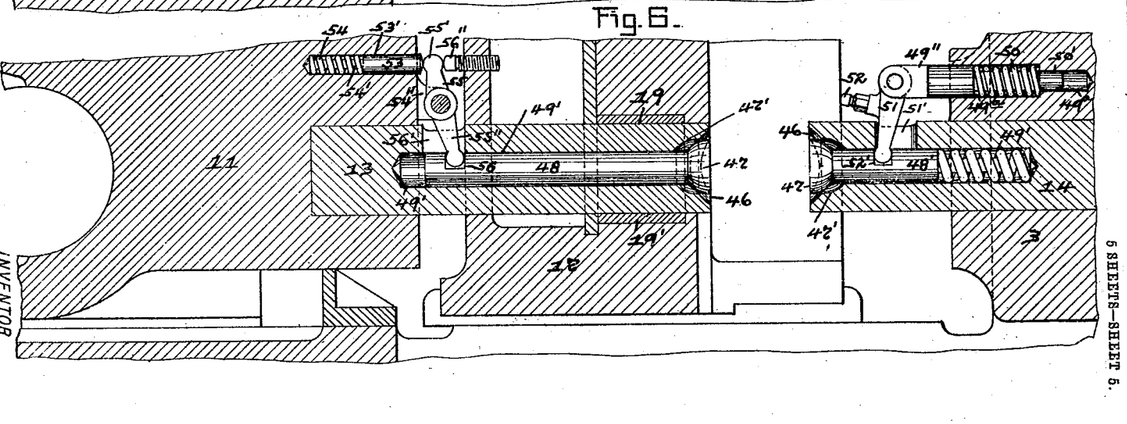
Fig. 6 is a like view showing the parts in another position.

In Figs. 5 and 6 there is shown the form of the plungers and manner of ejecting the briquets where such briquets are provided with rounded ends or formed globular shape, and in such case the plungers 13 and 14 are provided with the concave faces 46 46′ and their front and rear ends, respectively, which faces terminate at their rear or inner ends with the curved seats 47′ for confining the convex heads 47, formed on the front and rear ends of the ejecting-bars 48 48′, respectively. These ejecting-bars 48 48′ fit within seats 49′ in the plungers 13 and 14, and the bars 48′ have springs 49$^a$, fitting within said seats and around rods 48″ on the front ends of said bars 48′, while bars 49″ fit within seats 49′ in the front portion 3 of the machine, and around rods 50′ on said bars and within said seats 49$^a$ springs 50 are confined. An arm 51 is pivoted to each of the bars 49″, and the end of said arm passes through an opening or slot 51′ in the plungers 14 and is adapted to fit within seat 52′, formed in each of the bars 48′, while projecting out from said arms is a bolt-head 52 for operating said bars 48′ and 49″. Bars 53 fit within seats 53′ in the cross-head 11, and springs 54 are interposed around a rod 54′ on said bars 53 and within said seats 53′, while pivoted to brackets 54″ on said cross-head are the levers 55, which are pivoted, with the arms 55′ and 55″, thereon, the one arm 55′ being adapted to be engaged by the bars 53 and the other arm 55″ being adapted to pass through an opening or slot 56′ in the plungers 13 and fit within a seat 56 in said bars 48, while a bolt-head 56″ is secured into the rear wall of the feed-box 17 to engage said arm 55′. After a briquet has been formed within the mold-recesses 19 in the feed-box 17 the parts are in the position shown in Fig. 5, with the bars 48′ and 49″ drawn back by the forward movement of the feed-box 17 in engaging the bolt-heads 52 on the arms 51, and thereby seat the convex heads 47 on the bars 48′ in the seats 47′ during the compressing of the briquet by the plungers 13 and 14. The backward movement of the feed-box 17 and plungers 13 will allow the said feed-box to free itself from the heads 52, so that the springs 49 and 50 will be released of their compression and force out the bars 48′ and 49″ to the positions shown in Fig. 6, while at the same time the arms 55′ will be engaged between the bars 53 and bolt-heads 56″, so pushing said bars 53 and compressing the springs 54. This will also move the arms 55″ on the levers 55 forward, so as to force forward the bars 48 to unseat the heads 47 thereon from their seats to thereby eject the briquet from the faces 46 46′, and after the feed-box has again moved forward the springs 54 will be relieved of their compression, so that the bars 53 will be moved forward and the bars 48 will be moved backward to the position shown in Fig. 5.

By reason of the shape and form of the cams 41 and the cam-faces 41′ and 41″ on the yokes 40, carrying the cam-rods 42, connecting the feed-box 17, the said feed-box is adapted to be moved more rapidly in its forward and backward movements than that of the compressing-plungers 13, and during these movements of the said feed-box the material within the chamber 22 is fed to the chamber 23 in said feed-box by the feeding-plungers 24 in said chamber 22. By reason of the pin 27 carrying the feeding-plungers 24 and passing through the openings 27′ in the feed-box 17 so that the ends of the said pin fits within the slots 28′ in the rocking levers 28 for lowering said plungers the said slots will permit the raising and lowering of said plungers during the movements of said feed-box and at the same time will not interfere or interrupt the movements of such plungers.

It will be observed that the pressure-plates 26 within the feeding-plungers 24 can be of different thicknesses and of various numbers, if desired, in order to vary the pressure as desired in forming the blocks or briquets within the mold-recesses—as, for instance, by the insertion of thicker plates—the pressure on the blocks or briquets is increased, and these plates can be easily and quickly inserted within such feeding-plungers at any time by placing the number or thickness of plates desired within such feeding-plungers.

As the frame is all made in one casting and as the guides for the feed-box are formed on said casting, it is evident that the machine is reduced in simplicity from the ordinary class of this machinery. The working parts of the machine are covered up by the cover-plate 2′, which extends across and along the main frame 1, in order to protect these parts from the dust, dirt, &c., usually made and collected around such machinery, while the oil for lubricating the parts will be contained within the depressed rear portion of the bottom plate on the main frame, so as to be carried up and into the working parts as the parts on the crank-shaft are revolved through the same.

The front end of the main frame is bored the same as the feed-box, and as this end holds the backing-plungers by the shearing-plates it will be evident that these plungers, as well as the compressing-plungers, can be easily and quickly removed for changing or adjusting when desired or for any purpose by simply lifting out the shearing-plates and loosening the set-screws for these plungers, when the backing-plungers can be pushed out through the enlarged openings in the front end of the main frame and the compressing-plungers pushed out from the cross-head through the feed-box and mold-recesses and out through the said enlarged openings.

As large a number of mold-recesses as can be made in the feed-box can be used and the plungers correspondingly increased, while, if desired, the mold-recesses and plungers can be placed one above the other by simply increasing the width or height of the feed-box in either case, and in case it is desired to change the lines in the mold-recesses all that is necessary is to take or slide out the plate forming the guides for the feeding-plungers and knock out the old lines into the feed-box.

It will thus be seen that a long briquet can be made on the machine through a short stroke of the cross-head and connecting parts by means of the feeding-plungers holding the material down in the lower chamber of the feed-box and in front of the mold-recesses while the reciprocating or compressing plungers force it into such mold-recesses and compress the same. It will further be seen that all the parts of the machine are easy of access and not liable to get out of order, while at the same time all parts can be kept as well lubricated as desired, so as to allow of their free and easy working at all times.

Various modifications and changes in the construction, design, and operation of the machine may be resorted to without departing from the spirit of the invention or sacrificing any of its advantages.

What I claim as my invention, and desire to secure by Letters Patent, is—

1. In a molding-machine, the combination with a machine-frame, a crank-shaft, a reciprocating feed-box provided with mold-recesses therein, reciprocating plungers adapted to enter said mold-recesses, vertically-movable plungers within said feed-box, and means connected to said vertically-movable plungers and engaging with said crank-shaft for operating said vertically-movable plungers to feed and hold the material within said feed-box and between said mold-recesses and said reciprocating plungers to allow said reciprocating plungers to force said material into said mold-recesses and compress the same.

2. In a molding-machine, the combination with a machine-frame, a crank-shaft, a cam on said crank-shaft, a reciprocating feed-box provided with mold-recesses therein, reciprocating plungers adapted to enter said mold-recesses, vertically-movable plungers within said feed-box and means connected to said vertically-movable plungers and engaging with said cam for operating said vertically-movable plungers to feed and hold the material within said feed-box and between said mold-recesses and said reciprocating plungers to allow said reciprocating plungers to force said material into said mold-recesses and compress the same.

3. In a molding-machine, the combination with a machine-frame, a crank-shaft, a cam on said crank-shaft, a reciprocating feed-box provided with mold-recesses therein, reciprocating plungers adapted to enter said mold-recesses, vertically-movable plungers within said feed-box, and rocking levers or bars connected to said vertically-movable plungers and engaging with said cam for operating said vertically-movable plungers to feed and hold the material within said feed-box and between said mold-recesses and said reciprocating plungers to allow said reciprocating plungers to force said material into said mold-recesses and compress the same.

4. In a molding-machine, the combination with a machine-frame, a crank-shaft, a cam on said crank-shaft, a reciprocating feed-box provided with mold-recesses therein, reciprocating plungers adapted to enter said mold-recesses, vertically-movable plungers within said feed-box, a rock-shaft, levers extending from said rock-shaft and connected to said vertically-movable plungers, and a bar extending from said rock-shaft and adapted to be engaged by said cam to tilt said levers and bar in operating said vertically-movable plungers in feeding and holding the material within said feed-box and between said mold-recesses and said reciprocating plungers to allow said reciprocating plungers to force said material into said mold-recesses and compress the same.

5. In a molding-machine, the combination with a machine-frame, a crank-shaft, a cam on said crank-shaft, a reciprocating feed-box provided with mold-recesses therein, reciprocating plungers adapted to enter said mold-recesses, vertically-movable plungers within said feed-box, a pin extending through said vertically-movable plungers and projecting beyond the same through slots in the feed-box, a rock-shaft, levers extending from said rock-shaft and connected to the ends of said pin through slots in said levers, and a bar extending from said rock-shaft and carrying a roller at its end to be engaged by said cam to tilt said levers and bar in operating said vertically-movable plungers in feeding and holding the material within said feed-box and between said mold-recesses and reciprocating plungers to allow said reciprocating plungers to force said material into said mold-recesses and compress the same.

6. In a molding-machine, the combination with a machine-frame, a reciprocating feed-box provided with mold-recesses therein, reciprocating and stationary plungers adapted to enter said mold-recesses, ejector-bars within said plungers, and means for operating said ejector-bars by the movements of the feed-box to eject the blocks or briquets after the same are formed.

7. In a molding-machine, the combination with a machine-frame, a reciprocating feed-box provided with mold-recesses therein, a cross-head sliding on said frame, reciprocating plungers on said cross-head and adapted to enter said recesses, stationary plungers on said frame adapted to enter said recesses, ejector-bars within said plungers, and means for operating said ejector-bars by the movements of said feed-box and cross-head to eject the blocks or briquets after the same are formed.

8. In a molding-machine, the combination with a machine-frame, a reciprocating feed-box provided with mold-recesses therein, a cross-head sliding on said frame, reciprocating plungers on said cross-head and adapted to enter said recesses, stationary plungers on said frame and adapted to enter said recesses, ejector-bars within said plungers, and spring-operated arms engaging with said ejector-bars for operating the same by the movements of the feed-box and cross-head to eject the blocks or briquets after the same are formed.

9. In a molding-machine, the combination with a machine-frame, a reciprocating feed-box provided with mold-recesses therein, a cross-head sliding on said frame, reciprocating plungers on said cross-head and adapted to enter said recesses, stationary plungers on said frame adapted to enter said recesses, ejector-bars within said plungers, pivoted arms connected to said ejector-bars and being adapted to be engaged by the movements of said feed-box and cross-head to eject the blocks or briquets after the same are formed, and spring-operated bars for moving said arms in operating said ejector-bars.

10. In a molding-machine, the combination with a machine-frame, a reciprocating feed-box provided with mold-recesses therein, a cross-head sliding on said frame, reciprocating plungers on said cross-head and adapted to enter said recesses, stationary plungers on said frame adapted to enter said recesses, ejector-bars within said reciprocating plungers, spring-operated ejector-bars within said stationary plungers, pivoted arms passing through slots in said plungers and engaging with said ejector-bars, said arms being adapted to be engaged by the movements of said feed-box and cross-head to eject the blocks or briquets after the same are formed, and spring-operated bars mounted in said cross-head and frame for moving said arms in operating said ejector-bars.

11. In a molding-machine, the combination with a machine-frame, a reciprocating feed-box provided with mold-recesses therein, reciprocating plungers adapted to enter said mold-recesses, vertically-movable plungers within said feed-box for feeding and holding the material within said feed-box and between said mold-recesses and said reciprocating plungers to allow said reciprocating plungers to force said material into said mold-recesses and compress the same, and means on the vertically-movable plungers for regulating the amount of material fed to the mold-recesses.

12. In a molding-machine, the combination with a machine-frame, a reciprocating feed-box provided with mold-recesses therein, reciprocating plungers adapted to enter said mold-recesses, vertically-movable plungers within said feed-box for feeding and holding the material within said feed-box and between said mold-recesses and said reciprocating plungers to allow said reciprocating plungers to force said material into said mold-recesses and compress the same, and pressure-plates on said vertically-movable plungers for regulating the amount of material fed to the mold-recesses.

13. In a molding-machine, the combination with a machine-frame, a reciprocating feed-box provided with mold-recesses therein, reciprocating plungers adapted to enter said mold-recesses, vertically-movable plungers within said feed-box for feeding and holding the material within said feed-box and between said mold-recesses and said reciprocating plungers to allow said reciprocating plungers to force said material into said mold-recesses and compress the same, and removable pressure-plates on said vertically-movable plungers for regulating the amount of material fed to the mold-recesses.

In testimony whereof I, the said GRANT W. RIGBY, have hereunto set my hand.

GRANT W. RIGBY.

Witnesses:
J. N. COOKE,
ROBERT H. AXTHELM.